United States Patent
Barberis et al.

(10) Patent No.: US 8,882,939 B2
(45) Date of Patent: Nov. 11, 2014

(54) ZIRCONIUM ALLOY RESISTANT TO CORROSION IN DROP SHADOWS FOR A FUEL ASSEMBLY COMPONENT FOR A BOILING WATER REACTOR, COMPONENT PRODUCED USING SAID ALLOY, FUEL ASSEMBLY, AND USE OF SAME

(75) Inventors: Pierre Barberis, Ugine (FR); Véronique Rebeyrolle, Duingt (FR); Petra-Britt Hoffmann, Leinburg (DE); Jean-Jérôme Vermoyal, Chasselay (FR)

(73) Assignee: Areva NP, Courbevoie (FR)

( * ) Notice: Subject to any disclaimer, the term of this patent is extended or adjusted under 35 U.S.C. 154(b) by 1108 days.

(21) Appl. No.: 12/312,893

(22) PCT Filed: Nov. 21, 2007

(86) PCT No.: PCT/FR2007/001910
§ 371 (c)(1),
(2), (4) Date: Feb. 1, 2010

(87) PCT Pub. No.: WO2008/071862
PCT Pub. Date: Jun. 19, 2008

(65) Prior Publication Data
US 2010/0126636 A1  May 27, 2010

(30) Foreign Application Priority Data
Dec. 1, 2006 (FR) .................... 06 10546

(51) Int. Cl.
*C22C 16/00* (2006.01)
*G21C 3/07* (2006.01)
*C22F 1/18* (2006.01)

(52) U.S. Cl.
CPC . *C22C 16/00* (2013.01); *G21C 3/07* (2013.01); *Y02E 30/40* (2013.01); *G21Y 2002/103* (2013.01); *C22F 1/186* (2013.01)

USPC .......................................... 148/407

(58) Field of Classification Search
USPC .......................................... 148/407
See application file for complete search history.

(56) References Cited

U.S. PATENT DOCUMENTS

| | | | |
|---|---|---|---|
| 4,649,023 A | 3/1987 | Sabol et al. | |
| 5,266,131 A | 11/1993 | Foster et al. | |
| 5,832,050 A | 11/1998 | Rebeyrolle et al. | |
| 5,985,211 A | 11/1999 | Jeong et al. | |
| 6,261,516 B1 | 7/2001 | Jeong et al. | |
| 6,902,634 B2 * | 6/2005 | Jeong et al. | 148/557 |
| 7,738,620 B2 * | 6/2010 | Barberis et al. | 376/409 |

FOREIGN PATENT DOCUMENTS

| | | | |
|---|---|---|---|
| EP | 0 802 264 A1 | 10/1997 | |
| EP | 1 225 243 A1 | 7/2002 | |
| EP | 1 308 966 A1 | 5/2003 | |
| FR | 2 219 978 | 3/1973 | |
| GB | 1 408 375 | 10/1975 | |
| JP | 62 182258 | 8/1987 | |
| WO | WO 2006/004499 A1 | 1/2006 | |
| WO | WO 2006027436 A1 * | 3/2006 | |

OTHER PUBLICATIONS

Wood "A review of the application of chemical decontamination technology in the United States", Progress in Nuclear Energy, 23 (1), 35-80, 1990.*

* cited by examiner

*Primary Examiner* — Rebecca Lee
(74) *Attorney, Agent, or Firm* — Davidson, Davidson & Kappel, LLC

(57) ABSTRACT

A zirconium alloy that is resistant to shadow corrosion for a boiling water nuclear reactor fuel assembly component, the alloy being characterized in that:
its composition in percentages by weight is as follows:
Nb=0.4%-4.5%
Sn=0.20%-1.7%
Fe=0.05%-0.45%

Fe+Cr+Ni+V=0.05%-0.45%, with Nb≤9×[0.5−(Fe+Cr+V+Ni)]
S=traces-400 ppm
C=traces-200 ppm
Si=traces-120 ppm
O=600 ppm-1800 ppm
the balance being Zr and impurities from processing;

in that, during fabrication, after its last hot deformation, it is subjected to one or more heat treatments lying in the range 450° C. to 610° C. for a total duration of at least 4 h, with at least one cold rolling operation with a rolling ratio of at least 25%; and in that a final heat treatment operation is performed at a temperature in the range 450° C. to 610° C. for 1 minute to 20 hours.

A fuel assembly component made of the alloy, a fuel assembly including the component, and the use thereof.

10 Claims, 2 Drawing Sheets

ZIRCONIUM ALLOY RESISTANT TO CORROSION IN DROP SHADOWS FOR A FUEL ASSEMBLY COMPONENT FOR A BOILING WATER REACTOR, COMPONENT PRODUCED USING SAID ALLOY, FUEL ASSEMBLY, AND USE OF SAME

The invention relates to the field of nuclear reactors, and more precisely, to zirconium alloy elements that are used for making up fuel assemblies for nuclear reactors of the boiling water type (BWR).

BACKGROUND

Zr alloys are in widespread use in the fuel assemblies of nuclear reactors for making parts that are subjected to severe conditions of irradiation, of mechanical stress, and of corrosion. Such parts include cladding containing fuel pellets, boxes, grids, and various spacer elements, for example.

Various categories of Zr alloy have been developed, corresponding to various requirements of users depending on the looked-for properties of the various parts. These depend on the mechanical, thermal, and physicochemical (irradiation, corrosion) stresses to which they are subjected while in use in a reactor.

Amongst these alloys, some have the feature of containing significant quantities of Nb. A description can be found in particular in U.S. Pat. No. 4,649,023, where they are applied to fabricating tubes for light water reactors, both for boiling water reactors (BWR) and for pressurized water reactors (PWR).

Other documents (U.S. Pat. No. 5,266,131) envisage applying them to other parts that are made from sheets. However, until now, industrial applications for such alloys containing Nb have been limited to pressurized water reactors (PWR). Attempts at using the same alloys in boiling water reactors (BWR) have not yet been conclusive, since their behavior in terms of general corrosion and in terms of nodular corrosion is not satisfactory. It is thus common practice in BWRs to use other types of Zr alloy.

Proposals are made in document JP-A-62 182 258 for fuel assembly components, in particular for BWRs, to be made of a Zr—Nb—Sn—Fe—O alloy obtained by cold rolling, followed by $\beta$ (or $\alpha+\beta$) quenching, followed by work hardening by at least 30%, and then by aging at a temperature greater than the recrystallization temperature (e.g. 450° C.-550° C.), without subsequent cold rolling. That produces a structure having fine precipitates of $\beta$Nb and of $ZrFe_2$ intermetallic compounds. The idea is thus to obtain parts that are relatively insensitive to nodular corrosion and that have high toughness and ductility.

Proposals have recently been made (document WO-A-2006/004499) to use, in a BWR, alloys that contain Nb for making components from sheet metal. No alloy element is to be present therein at an amount greater than 1.6%. The thermomechanical treatments performed on the alloy lead to substantially all of the secondary phase particles being transformed into particles of $\beta$Nb containing at least 90% Nb. Preferably, the Fe content of the alloy lies in the range 0.3% to 0.6% by weight, and apart from Zr, Nb, and Fe, the alloy contains only Sn in significant amount. The content of any other alloy element must not exceed 500 parts per million (ppm). Those alloys seek to provide good resistance to conventional types of corrosion and to irradiation growth.

Nevertheless, a problem that is frequently encountered in BWRs is associated with the appearance of so-called "shadow corrosion".

That is a type of corrosion that arises when two parts made of materials of different kinds are coupled galvanically (electrons being transferred between the two materials that are immersed in a medium presenting non-zero electrical conductivity) in the presence of oxidizing species. Specifically, the conductive medium is the boiling water of the reactor. When the coupling occurs between a Zr alloy component (such as a box or fuel cladding) and a component made of an alloy based on Ni or of stainless steel (such as a grid for spacing the tubes apart), then localized white corrosion is observed to appear on the Zr alloy, on surfaces that correspond to shadows of other parts made of Ni based alloy or stainless steel. The phenomenon is amplified by irradiation that modifies the physicochemical characteristics of materials and creates oxidizing species on the surfaces of components by radiolyzing the heat-conveying fluid, in addition to the species created by the oxygen dissolved in the boiling water of the reactor. The quantity of dissolved oxygen is much greater than that present in the pressurized water of PWR reactors. BWR fuel assemblies are very sensitive to this type of corrosion, and the solutions that have been developed in the past for reducing or eliminating such localized corrosion consists, for example, in coating one of the components present so as to make it electrochemically compatible with the other (see document US-A-2006/0045232).

SUMMARY OF THE INVENTION

An object of the invention is to provide Zr alloy components for BWR fuel assemblies that are affected as little as possible by the phenomenon of shadow corrosion, while having properties that are satisfactory in use in terms of mechanical characteristics and in terms of ability to withstand conventional types of corrosion.

To this end, the invention provides a zirconium alloy that is resistant to shadow corrosion for a component of a boiling water nuclear reactor fuel assembly, the alloy being characterized in that:

its composition in percentages by weight is as follows:
Nb=0.4%-4.5%
Sn=0.20%-1.7%
Fe=0.05%-0.45%
Fe+Cr+Ni+V=0.05%-0.45%, with Nb≤9×[0.5−(Fe+Cr+V+Ni)]
S=traces-400 ppm
C=traces-200 ppm
Si=traces-120 ppm
O=600 ppm-1800 ppm
the balance being Zr and impurities from processing;

in that, during fabrication, after its last hot deformation, it is subjected to one or more heat treatments at a temperature lying in the range 450° C. to 610° C. for a total duration of at least 4 hours (h), with at least one cold rolling operation with a rolling ratio of at least 25%, no heat treatment subsequent to the hot deformation exceeding 610° C.; and in that a final heat treatment operation is performed at a temperature lying in the range 450° C. to 610° C. for a duration lying in the range 1 minute to 20 hours.

Its preferred composition, in percentages by weight, is as follows:
Nb=0.8%-3.6%
Sn=0.25%-1.7%
Fe=0.05%-0.32%
Fe+Cr+Ni+V=0.05%-0.32% with Nb≤9×[0.5−(Fe+Cr+V+Ni)]
S=10 ppm-35 ppm
C=traces-100 ppm Si=traces-30 ppm
O=600 ppm-1800 ppm
the balance being Zr and impurities from processing.

It may be subjected during fabrication to one or more cold rolling operations situated before or between or before and between the said heat treatment operation(s) performed at a temperature lying in the range 450° C. to 610° C. for a total duration of at least 4 h.

It may be in the partially or completely recrystallized state.

It may be in the stress-relieved state.

The invention also provides a component for a boiling water nuclear reactor fuel assembly, characterized in that it is made of an alloy of the above type.

The invention may also provide a boiling water nuclear reactor fuel assembly, characterized in that it includes components of the above type, and in that at least some of said components are placed in galvanic coupling conditions with other components made of alloy based on Ni or on stainless steel.

The invention also provides a use of a fuel assembly of the above type in a boiling water nuclear reactor in which the primary fluid contains up to 400 parts per billion (ppb) of dissolved oxygen.

The primary fluid may also contain up to 50 milliliters per kilogram (mL/kg) of dissolved hydrogen.

The primary fluid may also contain up to 50 ppb of zinc.

The primary fluid may also contain chemical species added for reducing the corrosion potential of materials in contact therewith.

As can be understood from the above, the invention relates to a Zr alloy for a BWR fuel assembly component containing significant quantities of Nb and Sn and also a little Fe. Limited quantities of Cr, Ni, V, S, and O may also be present.

These alloys should be subjected to one or more heat treatments performed in the range 450° C. to 610° C. for a total duration of at least 4 h, in order to ensure that the βZr phase that results from earlier heat treatment is decomposed into βNb phase. Any heat treatment subsequent to the hot deformation should be carried out at no more than 610° C. If higher temperature treatment were to be performed, then the βZr phase would be recreated, which would degrade the corrosion behavior of the alloy.

One or more cold rolling operations may be performed before, and/or between, and/or after the heat treatment(s). In particular, these heat treatments in the range 450° C. to 610° C. may be intermediate anneals performed between cold rolling passes. At least one of these cold rolling passes should be performed with a reduction ratio of at least 25%.

This run of heat treatment(s) and rolling operation(s) should be followed by final heat treatment of duration lying in the range 1 minute to 20 hours at a temperature of not less than 450° C. and not more than 610° C. Experience shows that performing the previous long heat treatment(s), even over a total duration of 10 h to 100 h, does not enable composition equilibrium to be achieved between the βNb and Zr(Nb,Fe)$_2$ precipitate phases. Performing at least one cold rolling operation that is sufficient (reduction ratio≥25%) between or after this/these long treatment(s), together with final heat treatment (such as, by way of non-limiting example, stress-relief or recrystallization annealing) makes it possible to achieve this equilibrium or to come sufficiently close thereto, while conserving treatment times that are reasonable.

It is under these conditions that the usual drawbacks of using alloys with Nb in BWRs can be overcome, and advantage can also be taken of the absence of shadow corrosion provided by such alloys when the parts they make up are under galvanic coupling conditions with parts made of a Ni-based alloy or of stainless steel that are to be found in their close environment.

It may be considered that there is a risk of galvanic coupling in a reactor when a Zr alloy component is in a situation enabling it to exchange electrons with another component made of a Ni-based alloy or of a stainless steel in a medium of non-zero conductivity, and when the medium (primary fluid) surrounding them contains up to 400 parts per billion of dissolved oxygen, i.e. likewise up to 50 mL/kg of dissolved hydrogen and/or up to 50 parts per billion of zinc, possibly with added noble metals, methanol, or any other chemical species for reducing the corrosion potential of the materials in contact with the primary fluid of the reactor. This can generally be achieved when the components are spaced apart by a distance of less than 20 mm.

Naturally, these alloys can be used also to make components for BWR fuel assemblies that are not to be found in galvanic coupling conditions, providing their properties make them well suited to such use.

BRIEF DESCRIPTION OF THE DRAWINGS

The invention can be better understood with the help of the following description given with reference to the accompanying figures.

DETAILED DESCRIPTION

Figure 1:
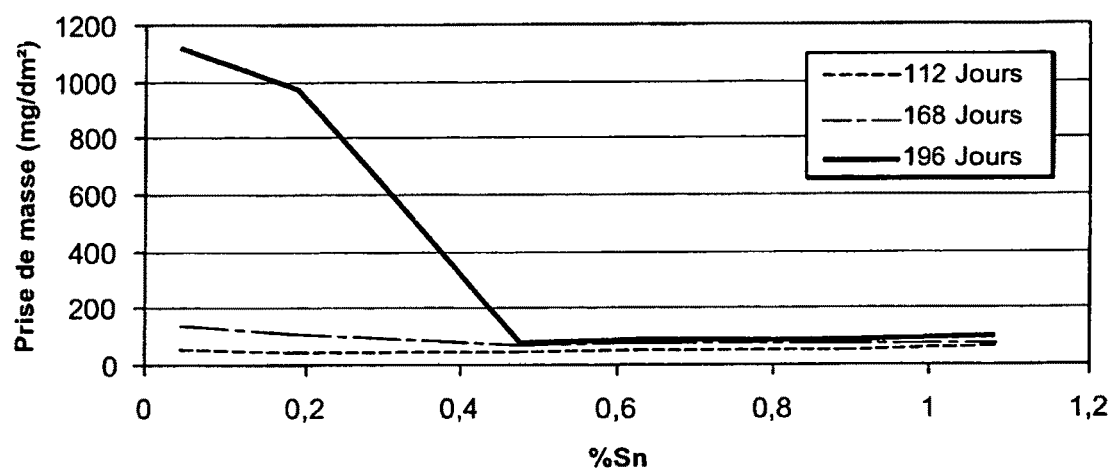
FIG. 1 shows the influence of Sn on the oxidation of tubes made of Zr alloy containing 1% Nb and 0.1% Fe in lithiated water at 360° C.

The shadow corrosion observed on BWR fuel assembly components is due, as mentioned above, to a galvanic coupling phenomenon assisted by irradiation taking place in an oxygenated medium. The specific effect of irradiation is difficult to reproduce in the laboratory, but it is known that irradiation accelerates the observed phenomena. It is easier to evaluate the effects of oxygen and of galvanic coupling in laboratory tests, which has been done using the following protocol.

Samples of alloys of the invention and of reference alloys were put into an autoclave under oxidizing conditions. For each alloy, two samples were tested, one coupled to an Inconel® (Ni-based alloy) sheet, and the other not coupled. A dissolved oxygen content of 100 ppm was maintained in the medium, as was a boron content of 0.12% in the form of boric acid, and a lithium content of 2 ppm in the form of lithia. The objective was to obtain an aggressive medium with a high oxygen potential, having effects on samples in a galvanic coupling situation that are comparable with those that result from spending time in a BWR.

The sensitivity of an alloy to shadow corrosion is expressed with the help of the ratio between the thicknesses of the oxides formed on the coupled sample and on the non-coupled sample. The greater this ratio, the more the alloy is sensitive to coupling, and thus to shadow corrosion. It is considered that a ratio greater than 2.5 represents an alloy having high sensitivity to shadow corrosion, thus making it unsuitable for use in a reactor under conditions of galvanic coupling.

Various tests have been performed, and the results are summarized in the tables and figures below.

The influence of tin on the oxidation of tubes made of an alloy having 1% Nb and 0.1% Fe at 360° C. in lithiated water having 70 ppm of Li has been evaluated on samples having the compositions set out in Table 1.

TABLE 1

Sample compositions showing the influence of Sn

| | References | | Invention | | | |
|---|---|---|---|---|---|---|
| | A | B | C | D | E | F |
| Sn (%) | 0.0039 | 0.19 | 0.48 | 0.63 | 0.89 | 1.08 |
| Fe (%) | 0.09 | 0.09 | 0.085 | 0.1 | 0.09 | 0.09 |
| Nb (%) | 1.1 | 1.05 | 1.05 | 1.05 | 1.11 | 1.08 |
| O (ppm) | 1390 | 1430 | 1450 | 1390 | 1460 | 1550 |
| C (ppm) | 18 | 14 | 13 | 23 | 21 | 23 |
| N (ppm) | 14 | 26 | 28 | 55 | 16 | 21 |
| Al (ppm) | 20 | 21 | 19 | 19 | 21 | 21 |
| Cr (ppm) | 33 | 32 | 35 | 33 | 34 | 36 |
| Hf (ppm) | 47 | 47 | 49 | 45 | 49 | 49 |
| S (ppm) | 12 | 15 | 18 | 26 | 15 | 12 |
| Si (ppm) | | | <10 | | | |

All of these samples were subjected to the following sequence of treatments:
melting the ingot;
forging in the β domain into the form of bars;
forging the bars in the α domain into the form of billets having a diameter (Ø) of 200 mm;
quenching in cold water from 1050° C.;
drilling the billets;
extrusion after preheating to 600° C.; and
four cold rolling passes in a pilger mill, with a rolling ratio on each pass lying in the range 55% to 83%, the passes being separated by intermediate anneals for 2 h at 575° C., followed by final heat treatment for 2 hours in the range 560° C. to 590° C., to obtain the final tube with a diameter of 9.75 mm and wall thickness of 0.57 mm.

FIG. 1 shows the weight gain of tubes A to F after 112, 168, and 196 days in the medium in question, without galvanic coupling. It can be seen that the reference samples A and B with 0.039% and 0.19% Sn present resistance to corrosion in lithiated water that begins to degrade between 112 and 168 days, and becomes clearly mediocre in the range 168 days to 196 days. Over the same period, samples of the invention C to F remained stable in corrosion. It is therefore necessary for samples of the invention to have an Sn content of not less than 0.20%, and preferably of at least 0.25%, so that the zones that are not subjected to shadow corrosion present good corrosion behavior.

Sensitivity to shadow corrosion was tested on samples having the compositions and the modes of preparation that are set out in Table 2. These samples were subjected to recrystallization annealing at the end of treatment.

TABLE 2

Compositions, treatments, and performance of recrystallized samples tested for shadow corrosion

| | G | H | I | J | K | L | M | N | O | P | Q |
|---|---|---|---|---|---|---|---|---|---|---|---|
| Nb (%) | 1.11 | 1 | 1 | 1 | 1 | 1 | 1 | 1 | 3 | 1 | 1 |
| Fe (%) | 0.014 | 0.04 | 0.16 | 0.16 | 0.35 | 0.098 | 0.104 | 0.19 | 0.06 | 0.1 | 0.35 |
| Sn (%) | 0.51 | 0.5 | 0.5 | 0.5 | 0.5 | 0.48 | 0.29 | 0.285 | 1 | 1 | 1.3 |
| O (ppm) | 1367 | 1491 | 1367 | 1367 | 1422 | 1470 | 1400 | 1380 | 1200 | 1300 | 1055 |
| S (pm) | 27 | 31 | 23 | 23 | 33 | 20 | 24 | 22 | 31 | <5 | <5 |
| C (ppm) | 29 | 38 | 29 | 29 | 29 | 37 | 44 | 37 | 110 | 100 | 66 |
| Si (ppm) | <10 | <10 | <10 | <10 | <10 | <10 | <10 | <10 | 104 | <100 | 70 |
| Al (ppm) | | | 28 | | | 19 | 21 | 21 | <30 | <30 | 25 |
| Cr (ppm) | | | 21 | | | 53 | 53 | 55 | <100 | <100 | 46 |
| N (ppm) | | | 20-23 | | | 23 | 27 | 28 | 23 | <30 | 16 |
| Component Range | Tubes | | | | | | | | Strip | | Tube |
| | Ingot melting | | | | | | | | | | |
| | Beta forging | | | | | | | | | | |
| | Alpha forging | | | | | | | | Beta quenching | | Alpha forging |
| | Beta quenching, billet drilling | | | | | | | | Hot rolling 770° C.-790° C. | | Beta quenching, billet drilling |
| | Extrusion at 600° C. | | | | | | | | Annealing 1 h 560° C.-590° C. | | Extrusion at 600° C. |
| | Four cold rolling (CR) passes with a rolling ratio on each pass lying in the range 55% to 83%, intermiate anneals for 2 h at 560° C.-590° C. | | | | | | | | Four cycles of CR (ratio 30% to 45% each), intermediate anneals for 1 h at 560° C.-590° C. | | Five cycles of CR (ratio 42% to 82% each) intermediate anneals for 2 h at 560° C.-590° C. |
| | Final anneal for 2 h at 560° C.-590° C. | | | | | | | | Final anneal for 7 min at 560° C.-590° C. | | Final anneal for 2 h at 560° C.-590° C. |
| Sensitivity to shadow corrosion | 3.5 | 4 | 2.25 | 2.5 | 1.5 | 1.6 | 1.9 | 1.75 | 1.14 | 2 | 1.2 |

Surprisingly, these tests show that in Zr—Nb—Sn—Fe alloys having Nb≥0.4% and Sn ≥0.2%, lowering the Fe content to values as low as 0.1% or even 0.06% does not lead to alloys that are particularly sensitive to shadow corrosion. It is only below Fe=0.05% (samples G and H) that sensitivity to shadow corrosion becomes too great (i.e. greater than 2.5, using the above-defined criterion).

It is believed that this favorable effect can be attributed to the formation of intermetallic $Zr(Nb,Fe)_2$ precipitates or of other intermetallic precipitates containing Nb and elements selected from Fe, Cr, Ni, and/or V, as opposed to βNb precipitates that do not contain these elements. The thermomechanical treatments performed in accordance with the invention make it possible to obtain equilibrium precipitates containing Nb, in sufficient number, and reliably.

Simultaneously, the presence of βNb precipitates and not of βZr, makes it possible to conserve good resistance to uniform corrosion.

Figure 2:
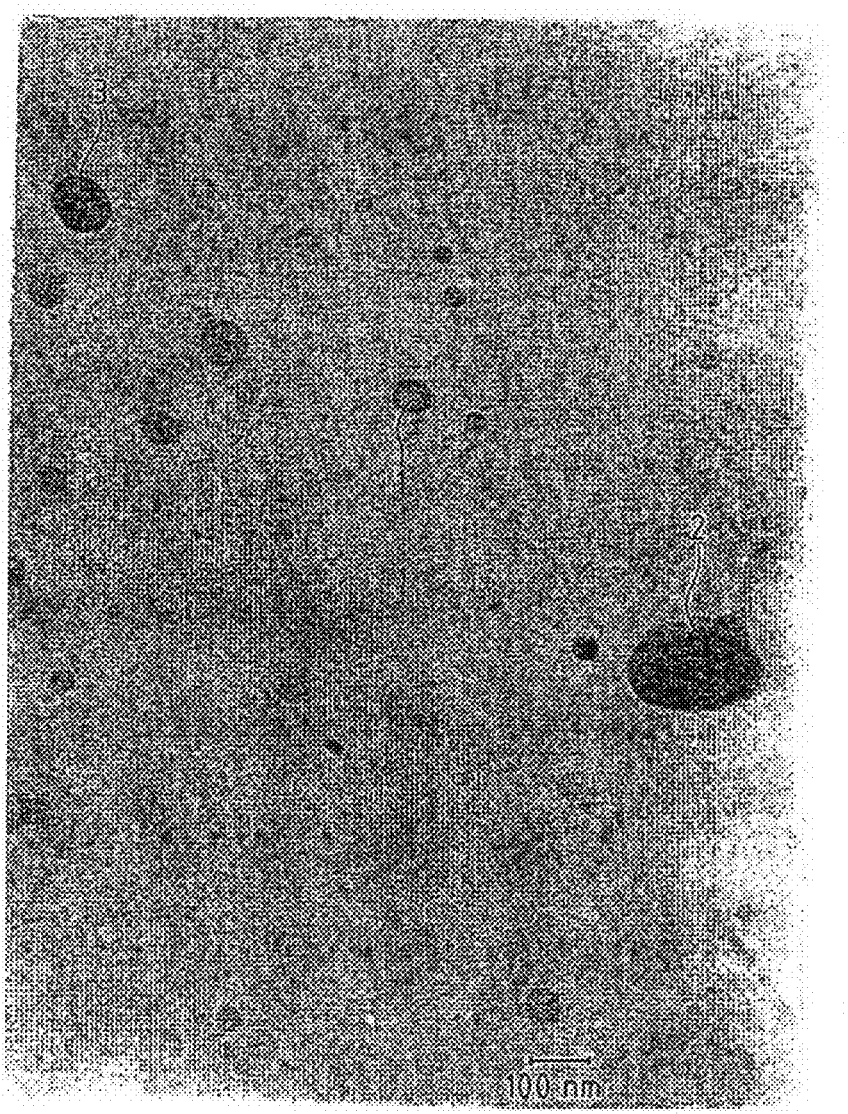
FIG. 2 is a micrograph of an alloy of the invention, with precipitates typical of this alloy.

FIG. 2 is a micrograph made at high magnification using a transmission electron microscope on an alloy of the invention, i.e. sample L in Table 2. There can be seen the presence of precipitates 1 of βNb and also of intermetallic compounds $Zr(Nb,Fe)_2$ 2, 3 that are typical of the invention.

The presence of Fe is also favorable for alloys having about 3% Nb and 1% Sn, for easier recrystallization, and thus for better capacity of the alloy for being transformed.

It has also been verified that oxygen, at concentrations of 600 ppm to 1800 ppm, and sulfur at concentrations of 10 ppm to 400 ppm does not have any effect on corrosion resistance and sensitivity to galvanic coupling. Oxygen and sulfur can be added in conventional manner, as set out in document FR-A-2 219 978 for oxygen and EP-A-0 802 264 for sulfur, in order to adjust the mechanical properties of the alloy, such as creep resistance.

Apparently Sn does not have a marked effect on sensitivity to shadow corrosion. Its content should therefore be selected for the purpose of obtaining a compromise between resistance to uniform corrosion and resistance to nodular corrosion which it tends to degrade (but not resistance to corrosion in a lithiated medium), and the mechanical properties that it tends to improve. This compromise varies as a function of applications. In general, the Sn content should be in the range 0.2% to 1.7%, preferably in the range 0.25% to 1.7%.

Account should also be taken of transformation difficulties that may arise in certain alloys.

Thus, Fe should not exceed 0.45% since otherwise precipitates of too great a size are present.

Furthermore, the Nb content, if too great (greater than 4.5%) tends to harden the alloy and slow down recrystallization, particularly when the Fe content is high, and thus, precipitates containing both Fe and Nb become more numerous and tend to anchor dislocations and grain boundaries.

Cr, V, and Ni, that lead to precipitates analogous to those formed by Fe can take the place of Fe and must therefore, from this point of view, also be taken into account.

It has been found that below an Nb content of 9×[0.5−(Fe+Cr+V+Ni)], and better below 9×[0.4−(Fe+Cr+V+Ni)], alloys of the invention do not present any particular transformation difficulties, including for recrystallization.

However, if the Nb content is less than 0.4%, resistance to nodular corrosion at 500° C. becomes insufficient.

It is therefore appropriate to select an Nb content in the range 0.4% to 4.5%, while also ensuring that it satisfies the above-mentioned relationship Nb≤9×[0.5−(Fe+Cr+V+Ni)], better Nb≤9×[0.4−(Fe+Cr+V+Ni)].

Tests have also been performed on sensitivity to shadow corrosion with alloy tubes in the stress-relieved state. Their composition, the treatments to which they were subjected, and the results concerning sensitivity to shadow corrosion appear in Table 3.

TABLE 3

Compositions, treatments, and performance of relaxed samples tested for shadow corrosion

|  | R | S | T | U | V | W |
|---|---|---|---|---|---|---|
| Nb (%) | 1.09 | 1 | 1.07 | 1.10 | 0.97 | 0.98 |
| Fe (%) | 0.095 | 0.35 | 0.093 | 0.097 | 0.198 | 0.097 |
| Sn (%) | 0.48 | 0.48 | 0.19 | 0.30 | 0.29 | <30 ppm |
| O (ppm) | 1550 | 1420 | 1468 | 1496 | 1390 | 1440 |
| S (ppm) | 22 | 23 | 18 | 21 | 20 | 17 |
| C (ppm) | 37 | 32 | 39 | 38 | 44 | 32 |
| Si (ppm) | <10 | 11 | <10 | <10 | <10 | <10 |
| Al (ppm) | 20 | 25 | 18 | 20 | 20 | 14 |
| Cr (ppm) | 21 | 21 | 33 | 33 | 55 | 53 |
| N (ppm) | 20-23 | 20-23 | 30 | 30 | 28 | 23 |
| Component | Tubes | | | | | |
| Range | Ingot melting | | | | | |
|  | Beta forging | | | | | |
|  | Alpha forging | | | | | |
|  | Billet drilling | | | | | |
|  | Extrusion at 600° C. | | | | | |
|  | Four cycles of cold rolling at ratios lying in the range 55% to 83%, with 2 h anneals at 575° C. | | | | | |
| Sensitivity to shadow corrosion | 1.3 | 1.2 | 1.3 | 1.3 | 1.3 | 1.5 |

The 2 h anneal at 575° C. performed after the last cold rolling operation constitutes the final anneal in the meaning of the invention.

Sample W is not in accordance with the invention, in that it does not contain any Sn. However it shows that Sn does not have any marked effect on shadow corrosion, at least in combination with the other elements present in the recommended amounts.

It can be seen that for compositions compatible with those of the recrystallized samples, the sensitivity to shadow corrosion of the stress-relieved samples is even lower. The invention is thus compatible with both states, and consequently with intermediate states of partial recrystallization.

The excellent performance of BWR fuel assembly components of the invention makes it possible for them to be used in conditions where shadow corrosion is likely to be particularly high, for example when noble metals and/or iron and/or hydrogen are dissolved in large quantities in the water of the reactor.

What is claimed is:

1. A boiling water nuclear reactor fuel assembly, comprising:
   components comprising a zirconium alloy that is resistant to shadow corrosion for a boiling water nuclear reactor fuel assembly component, the alloy having a composition in percentages by weight comprising:
   Nb=0.4% -4.5%;
   Sn=0.20% -1.7%;
   Fe=0.05% -0.45%;
   Fe+Cr+Ni+V=0.05% -0.45%, with Nb9 ×[0.5−(Fe+Cr+V+Ni)];
   S=traces -400 ppm;
   C=traces -200 ppm;
   Si=traces -120 ppm;
   O=600 ppm -1800 ppm; and
   the balance being Zr and impurities from processing;
   wherein, during fabrication, after the alloy's last hot deformation, the alloy is subjected to one or more heat treatments at a temperature lying in the range 450° C. to 610° C. for a total duration of at least 4 hours, with at least one cold rolling operation with a rolling ratio of at least 25%, no heat treatment subsequent to the hot deformation exceeding 610° C.; and
   wherein a final heat treatment operation is performed at a temperature lying in the range 450° C. to 610° C. for a duration lying in the range 1 minute to 20 hours; and
   wherein at least some of the components are placed in galvanic coupling conditions with other components made of alloy based on Ni or on stainless steel.

2. The alloy as recited in claim 1 wherein the alloy composition, in percentages by weight, comprises:
   Nb=0.8% -3.6%
   Sn=0.25% -1.7%
   Fe=0.05% -0.32%
   Fe+Cr+Ni+V=0.05% -0.32% with Nb≤9 ×[0.5−(Fe+Cr+V+Ni)]
   S=10 ppm -35 ppm
   C=traces -100 ppm
   Si=traces -30 ppm
   O=600 ppm -1800 ppm
   the balance being Zr and impurities from processing.

3. The alloy as recited in claim 1 wherein the alloy is subjected during fabrication to at least one cold rolling operation, the cold rolling operation(s) situated before or between or before and between the heat treatment operation(s) performed at a temperature lying in the range 450° C. to 610° C. for a total duration of at least 4 hours.

4. The alloy as recited in claim 1 wherein the alloy is in a partially or completely recrystallized state.

5. The alloy as recited in claim 1 wherein the alloy is in a stress-relieved state.

6. A boiling water nuclear reactor fuel assembly, comprising:
   components comprising a zirconium alloy that is resistant to shadow corrosion for a boiling water nuclear reactor fuel assembly component, the alloy having a composition in percentages by weight comprising:
   Nb=0.4% -4.5%;
   Sn=0.20% -1.7%;
   Fe=0.05% -0.45%;
   Fe+Cr+Ni+V=0.05% -0.45%, with Nb9 ×[0.5−(Fe+Cr+V+Ni)];
   S=traces -400 ppm;
   C=traces -200 ppm;
   Si=traces -120 ppm;
   O=600 ppm -1800 ppm; and
   the balance being Zr and impurities from processing;
   wherein, during fabrication, after the alloy's last hot deformation, the alloy is subjected to one or more heat treatments at a temperature lying in the range 450° C. to 610° C. for a total duration of at least 4 hours, with at least one cold rolling operation with a rolling ratio of at least 25%, no heat treatment subsequent to the hot deformation exceeding 610° C.;
   wherein a final heat treatment operation is performed at a temperature lying in the range 450° C. to 610° C. for a duration lying in the range 1 minute to 20 hours; and
   wherein the alloy has a reduced sensitivity to shadow corrosion, expressed by a ratio of at most 2.5, the ratio being a relationship between thicknesses of the oxide layers formed on the alloy when the alloy is galvanically coupled to another material and thicknesses of the oxide layers formed on the alloy when the alloy is not galvanically coupled to another material; and
   wherein at least some of the components are placed in galvanic coupling conditions with other components made of alloy based on Ni or on stainless steel.

7. The alloy as recited in claim 6 wherein the alloy composition, in percentages by weight, comprises:
   Nb=0.8% -3.6%
   Sn=0.25% -1.7%
   Fe=0.05% -0.32%
   Fe+Cr+Ni+V=0.05% -0.32% with Nb≤9 ×[0.5−(Fe+Cr+V+Ni)]
   S=10 ppm -35 ppm
   C=traces -100 ppm
   Si=traces -30 ppm
   O=600 ppm -1800 ppm
   the balance being Zr and impurities from processing.

8. The alloy as recited in claim 6 wherein the alloy is subjected during fabrication to at least one cold rolling operation, the cold rolling operation(s) situated before or between or before and between the heat treatment operation(s) performed at a temperature lying in the range 450° C. to 610° C. for a total duration of at least 4 hours.

9. The alloy as recited in claim 6 wherein the alloy is in a partially or completely recrystallized state.

10. The alloy as recited in claim 6 wherein the alloy is in a stress-relieved state.

* * * * *